(12) United States Patent
Sato

(10) Patent No.: US 11,645,794 B2
(45) Date of Patent: May 9, 2023

(54) MONITORING APPARATUS, MONITORING METHOD, AND COMPUTER-READABLE MEDIUM HAVING RECORDED THEREON MONITORING PROGRAM

(71) Applicant: Yokogawa Electric Corporation, Tokyo (JP)

(72) Inventor: Masahiko Sato, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 17/386,634

(22) Filed: Jul. 28, 2021

(65) Prior Publication Data
US 2022/0067990 A1   Mar. 3, 2022

(30) Foreign Application Priority Data

Aug. 27, 2020 (JP) .............................. JP2020-143952

(51) Int. Cl.
*G06T 11/20* (2006.01)
*G06F 3/0482* (2013.01)
*H04Q 9/00* (2006.01)
*H04L 67/12* (2022.01)

(52) U.S. Cl.
CPC .......... *G06T 11/206* (2013.01); *G06F 3/0482* (2013.01); *H04Q 9/00* (2013.01); *H04L 67/12* (2013.01)

(58) Field of Classification Search
CPC .................................................... G06T 11/206
USPC ......................................................... 345/440
See application file for complete search history.

(56) References Cited

U.S. PATENT DOCUMENTS

| | | | |
|---|---|---|---|
| 5,584,012 A * | 12/1996 | Kojima | G06F 3/0689 711/E12.04 |
| 9,940,184 B2 | 4/2018 | Shibuya | |
| 10,956,808 B1 * | 3/2021 | Bhardwaj | G06N 3/0445 |
| 11,410,891 B2 * | 8/2022 | Phan | G06N 3/0445 |

(Continued)

FOREIGN PATENT DOCUMENTS

| | | | | |
|---|---|---|---|---|
| EP | 3547057 A1 * | 10/2019 | | G01M 99/005 |
| EP | 3547057 A1 | 10/2019 | | |

(Continued)

OTHER PUBLICATIONS

Partial European Search Report for European Patent Application No. 21192857.7, issued by the European Patent Office dated Jan. 31, 2022.

(Continued)

*Primary Examiner* — Reza Nabi

(57) ABSTRACT

Provided is a monitoring apparatus comprising: a selection unit configured to select, among a plurality of state values corresponding to measurement values from a plurality of sensors for monitoring states of a plurality of facilities, a state value that has changed by an amount equal to or greater than a predetermined change width or change rate during a predetermined time length period; a sort unit configured to sort at least one state value selected, according to a change width or a change rate; and a display processing unit configured to perform processing to display an information screen corresponding to the at least one state value sorted.

20 Claims, 12 Drawing Sheets

(56) References Cited

U.S. PATENT DOCUMENTS

| | | | | |
|---|---|---|---|---|
| 2006/0027653 | A1* | 2/2006 | Sato | G06K 17/0022 235/435 |
| 2008/0071467 | A1* | 3/2008 | Johnson | G08G 1/052 701/119 |
| 2008/0184347 | A1* | 7/2008 | Minami | G06F 3/0676 726/5 |
| 2010/0131213 | A1* | 5/2010 | Bleys | G01L 19/086 702/50 |
| 2010/0325270 | A1* | 12/2010 | Ishizaka | F24F 11/30 709/224 |
| 2012/0041575 | A1* | 2/2012 | Maeda | G05B 23/024 700/79 |
| 2013/0073260 | A1* | 3/2013 | Maeda | G05B 23/0224 702/183 |
| 2013/0338964 | A1* | 12/2013 | Kobayashi | G06F 17/40 702/176 |
| 2014/0195184 | A1* | 7/2014 | Maeda | G01M 99/00 702/183 |
| 2015/0169393 | A1* | 6/2015 | Shibuya | G05B 23/0243 702/182 |
| 2015/0332490 | A1* | 11/2015 | Coulmeau | B64D 43/00 701/3 |
| 2016/0040925 | A1* | 2/2016 | Saunders, IV | F25B 49/005 165/11.2 |
| 2018/0196639 | A1* | 7/2018 | Fujita | G06F 17/11 |
| 2018/0275642 | A1* | 9/2018 | Tajima | G06N 3/0454 |
| 2018/0314238 | A1* | 11/2018 | Fujita | G05B 19/4184 |
| 2018/0314243 | A1* | 11/2018 | Fujita | G05B 13/0265 |
| 2018/0357556 | A1* | 12/2018 | Rai | G06N 20/00 |
| 2019/0130659 | A1* | 5/2019 | Ide | G07C 5/0808 |
| 2019/0217475 | A1* | 7/2019 | Neuhaus | B25J 9/1694 |
| 2019/0219981 | A1* | 7/2019 | Lepratti | G05B 19/058 |
| 2019/0302707 | A1* | 10/2019 | Guo | G06N 3/088 |
| 2019/0324439 | A1* | 10/2019 | Cella | G05B 13/028 |
| 2019/0340392 | A1* | 11/2019 | Khorrami | G06F 11/3612 |
| 2020/0019852 | A1* | 1/2020 | Yoon | G06V 10/764 |
| 2020/0057956 | A1* | 2/2020 | Phan | G06N 20/00 |
| 2020/0104224 | A1* | 4/2020 | Katou | G06F 11/321 |
| 2020/0116522 | A1* | 4/2020 | Paul | G06K 9/6227 |
| 2020/0226920 | A1* | 7/2020 | Takenaka | G08G 1/0133 |
| 2020/0234143 | A1* | 7/2020 | Yoon | G07C 3/14 |
| 2020/0386656 | A1* | 12/2020 | Jung | G06N 20/00 |
| 2021/0066141 | A1* | 3/2021 | Phan | G06N 20/00 |
| 2021/0110262 | A1* | 4/2021 | Schmitt | G06N 3/088 |
| 2021/0116076 | A1* | 4/2021 | Ward | G06N 3/084 |
| 2021/0116892 | A1* | 4/2021 | Bonzi | G05B 19/4183 |
| 2021/0116896 | A1* | 4/2021 | Arabshahi | G06N 3/08 |
| 2021/0158307 | A1* | 5/2021 | DeLuca | G06Q 10/06311 |
| 2021/0170590 | A1* | 6/2021 | Laftchiev | B25J 9/1674 |
| 2021/0173377 | A1* | 6/2021 | Laftchiev | B25J 9/1674 |
| 2021/0182693 | A1* | 6/2021 | Herlocker | F24F 11/62 |
| 2021/0224599 | A1* | 7/2021 | Tajima | G06K 9/6276 |
| 2021/0256991 | A1* | 8/2021 | Jun | G10L 25/51 |
| 2021/0326741 | A1* | 10/2021 | Ardel | G05D 7/0676 |
| 2021/0334656 | A1* | 10/2021 | Sjögren | G05B 23/024 |
| 2021/0385233 | A1* | 12/2021 | Chopra | G06F 8/63 |
| 2022/0019209 | A1* | 1/2022 | Kloepper | G05B 23/0243 |
| 2022/0019863 | A1* | 1/2022 | Iskandar | G06K 9/6284 |
| 2022/0043703 | A1* | 2/2022 | Hwang | G06F 40/40 |
| 2022/0066435 | A1* | 3/2022 | Thimmanaik | G06T 7/0006 |
| 2022/0067990 | A1* | 3/2022 | Sato | G06T 11/206 |
| 2022/0172069 | A1* | 6/2022 | Kim | G06Q 50/163 |

FOREIGN PATENT DOCUMENTS

| | | |
|---|---|---|
| EP | 2752722 B1 | 11/2019 |
| JP | H08234832 A | 9/1996 |
| JP | H11272326 A | 10/1999 |
| JP | 2016012240 A | 1/2016 |
| JP | 2020057192 A | 4/2020 |

OTHER PUBLICATIONS

Seiki Odawara, "An Integrated Solution Offered by Sushi Sensor and Grandsight", Yokogawa Technical Report, vol. 61 No. 1 (2018): p. 21-p. 24,Yokogawa Electric Corporation, Tokyo, Japan.

Akirou Kitajima et al., "Sushi Sensor for Industrial IoT Solution Achieves 'Sense-making'", Yokogawa Technical Report, vol. 62 No. 2 (2019): p. 61-p. 68,Yokogawa Electric Corporation, Tokyo, Japan.

Extended European Search Report for European Patent Application No. 21192857.7, issued by the European Patent Office dated Jun. 27, 2022.

Office Action issued for counterpart Japanese Application No. 2020-143952, issued by the Japanese Patent Office dated Feb. 7, 2023 (drafted on Jan. 26, 2023).

* cited by examiner

| TIME | FACILITY 1 | | | | FACILITY 2 | | | |
|---|---|---|---|---|---|---|---|---|
| | SENSOR 1 | SENSOR 2 | SENSOR 3 | STATE VALUE | SENSOR 1 | SENSOR 2 | SENSOR 3 | STATE VALUE |
| ⋮ | ⋮ | ⋮ | ⋮ | ⋮ | ⋮ | ⋮ | ⋮ | ⋮ |
| 2020/6/1 1:00 | 10.1 | 5.3 | 28.1 | 0.95 | 11.1 | 6.3 | 30.9 | 0.88 |
| 2020/6/1 2:00 | 11.1 | 5.5 | 28.1 | 0.96 | 13.1 | 6.5 | 31.1 | 0.85 |
| 2020/6/1 3:00 | 10.5 | 5.6 | 28.1 | 0.94 | 12.5 | 6.6 | 31.1 | 0.87 |
| ⋮ | ⋮ | ⋮ | ⋮ | ⋮ | ⋮ | ⋮ | ⋮ | ⋮ |

*FIG. 4*

COOLING PUMP SELECTION CONDITION CHANGE SETTING

PERIOD

○ NO TIME LIMIT

● UNTIL 2020/08/01

THRESHOLD

DO NOT DISPLAY IN RANKING WHEN DROP WIDTH IS [ 0.3 ] OR LESS

SAVE    CANCEL

*FIG. 9*

```
RANKING EXTRACTION SETTING
```

JUDGEMENT PERIOD

JUDGEMENT BY CHANGES FOR THE LAST [ 5 ] DAYS

TARGET DATA

[ ▼ DIAGNOSTIC VALUE ]

DIRECTION OF CHANGE

- ⦿ RISE
- ○ DROP

FILTER BY THRESHOLD

- ⦿ ONLY FACILITY WITH CHANGE WIDTH OF [ 0.2 ] OR MORE
- ○ DO NOT FILTER (DISPLAY ALL)

MOVING AVERAGE PROCESSING

- ⦿ WINDOW SIZE: [ 10 ] DATA
- ○ DO NOT USE

[ SAVE ]  [ CANCEL ]

*FIG. 11*

MONITORING APPARATUS, MONITORING METHOD, AND COMPUTER-READABLE MEDIUM HAVING RECORDED THEREON MONITORING PROGRAM

The contents of the following Japanese patent application is incorporated herein by reference:
NO. 2020-143952 filed in JP on Aug. 27, 2020

BACKGROUND

1. Technical Field

The present invention relates to a monitoring apparatus, a monitoring method, and a computer-readable medium having recorded thereon a monitoring program.

2. Related Art

A conventionally used monitoring system allows an operational status of a plant or the like, etc. to be monitored by providing sensors in various facilities such as plants and displaying a measurement values from the sensors on a monitoring screen. With development of Industrial Internet of Things (IIoT), facility monitoring by many sensors is becoming common in recent years. As such, the monitoring system displays, on the monitoring screen, many graphs showing transitions of measurement values from the many sensors (see, for example, Non-Patent Documents 1 and 2).

PRIOR ART DOCUMENT

Non-Patent Document

Non-Patent Document 1: Seiki Odawara 'An Integrated Solution Offered by Sushi Sensor and GRANDSIGHT' Yokogawa Technical Report, Vol. 61 No. 1 (2018): 21-24.
Non-Patent Document 2: Akirou Kitajima '"Sushi Sensor" for Industrial IoT Solution Achieves Sense-making' Yokogawa Technical Report, Vol. 62 No. 2 (2019): 61-68.

SUMMARY

A first aspect of the present invention provides a monitoring apparatus. The monitoring apparatus may be provided with a selection unit configured to select, among a plurality of state values corresponding to measurement values from a plurality of sensors for monitoring states of a plurality of facilities, a state value that has changed by an amount equal to or greater than a predetermined change width or change rate during a predetermined time length period. The monitoring apparatus may be provided with a sort unit configured to sort at least one state value selected, according to a change width or a change rate. The monitoring apparatus may be provided with a display processing unit configured to perform processing to display an information screen corresponding to the at least one state value sorted.

The monitoring apparatus may be provided with a calculation unit configured to calculate, based on at least one measurement value from at least one sensor of the plurality of sensors for monitoring a state of each facility of the plurality of facilities, a state value of each facility.

The monitoring apparatus may be further provided with a learning processing unit configured to perform, for each facility, processing to generate, by learning, a model that calculates the state value from the at least one measurement value. The calculation unit may calculate, for each facility, the state value from the at least one measurement value by using the model.

The learning processing unit may perform, for at least one facility, processing to generate, by learning, the model by statistical learning using the at least one measurement value.

The display processing unit may perform, in association with each of sorted state values, processing to display a learning button for instructing to generate the model. The learning processing unit may perform, in response to the learning button being pressed, processing to generate the model by learning.

The monitoring apparatus may be further provided with a selection condition input unit configured to input, for at least one of the plurality of state values, designation of at least one of the predetermined time length and the predetermined change width or change rate.

The monitoring apparatus may be further provided with an exclusion period input unit configured to input, for the at least one of the plurality of state values, designation of an exclusion period during which the at least one of the plurality of state values is excluded from the selection by the selection unit. The selection unit may avoid selecting, during the exclusion period, a state value for which the exclusion period is designated.

The monitoring apparatus may be further provided with a change period input unit configured to input, for the at least one of the plurality of state values, designation of a change period during which the at least one of the predetermined time length and the predetermined change width or change rate is changed, and designation of a change value of the at least one of the predetermined time length and the predetermined change width or change rate. The selection unit may select, for a state value for which the change period is designated, a state value by changing the at least one of the predetermined time length and the predetermined change width or change rate to the change value designated, during the change period.

The display processing unit may perform, in association with each of the at least one state value sorted, processing to display a graph display button for instructing to display a trend graph related to said state value. The display processing unit may perform, in response to the graph display button being pressed, processing to display a trend graph related to a corresponding state value.

The display processing unit may perform, in response to none of the plurality of state values being selected by the selection unit, processing to display that there is no selected state value.

The display processing unit may change, according to magnitude of a change width or a change rate of each state value, a display format of said state value.

A second aspect of the present invention provides a monitoring method. The monitoring method may include selecting by the monitoring apparatus, among a plurality of state values corresponding to measurement values from a plurality of sensors for monitoring states of a plurality of facilities, a state value that has changed by an amount equal to or greater than a predetermined change width or change rate during a predetermined time length period. The monitoring method may include sorting by the monitoring apparatus, at least one state value selected, according to a change width or a change rate. The monitoring method may include performing by the monitoring apparatus, processing to display an information screen corresponding to the at least one state value sorted.

A third aspect of the present invention provides a computer-readable medium having recorded thereon a monitoring program that, when executed by a computer, causes the computer to function as a monitoring apparatus. The monitoring apparatus may be provided with a selection unit configured to select, among a plurality of state values corresponding to measurement values from a plurality of sensors for monitoring states of a plurality of facilities, a state value that has changed by an amount equal to or greater than a predetermined change width or change rate during a predetermined time length period. The monitoring apparatus may be provided with a sort unit configured to sort at least one state value selected, according to a change width or a change rate. The monitoring apparatus may be provided with a display processing unit configured to perform processing to display an information screen corresponding to the at least one state value sorted.

The summary clause does not necessarily describe all necessary features of the embodiments of the present invention. The present invention may also be a sub-combination of the features described above.

BRIEF DESCRIPTION OF THE DRAWINGS

FIG. 4 shows an example of historical data recorded in a recording unit 205 according to an embodiment of the present invention.

FIG. 9 shows an example of a selection condition change designation screen outputted by the monitoring apparatus 140 according to an embodiment of the present invention.

FIG. 11 shows an example of a selection condition designation screen according to a variation of an embodiment of the present invention.

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
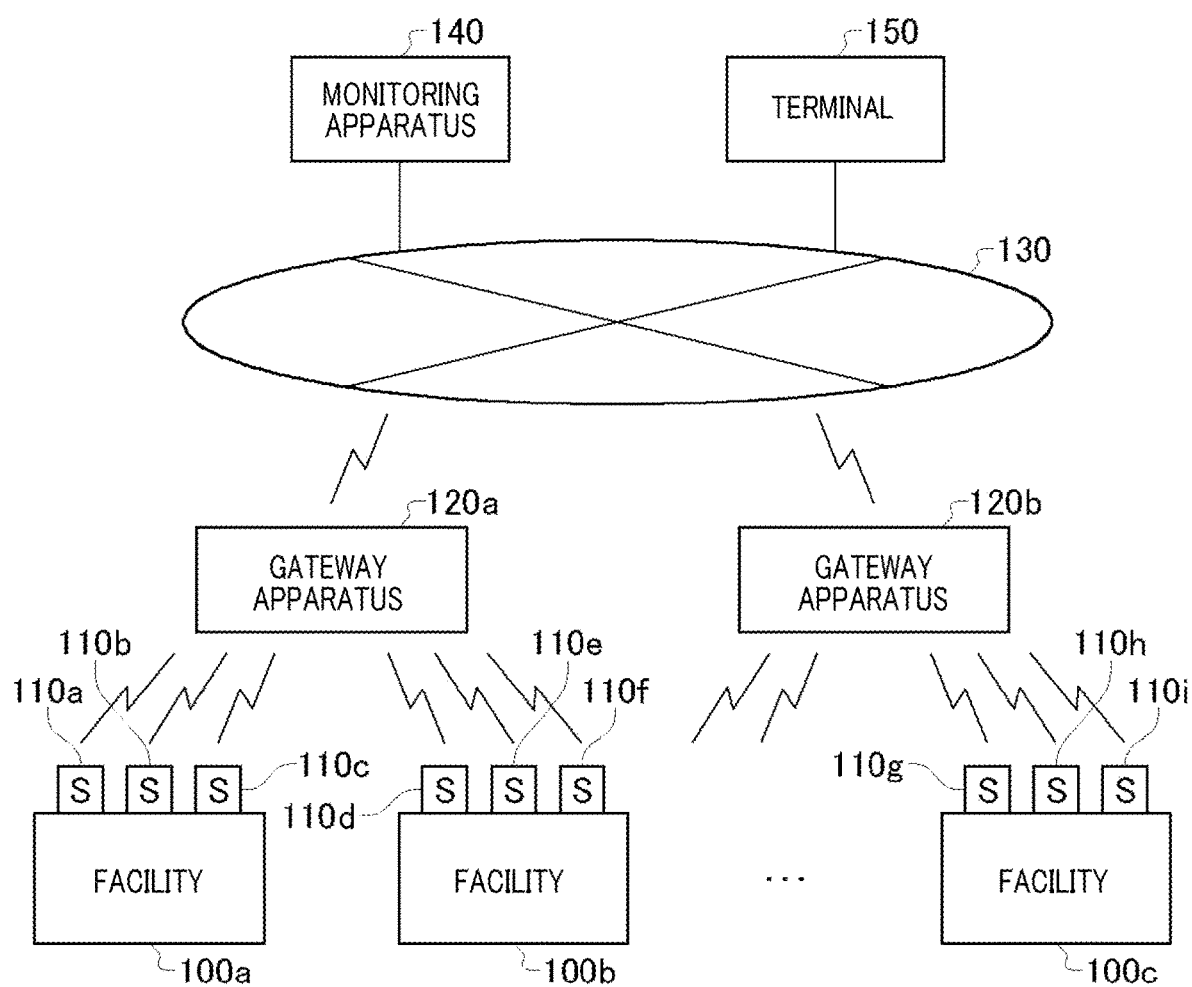
FIG. 1 shows a configuration of a monitoring system 10 according to an embodiment of the present invention together with facilities 100a to 100c.

FIG. 1 shows a configuration of a monitoring system 10 according to this embodiment together with facilities 100a to 100c. The one or more facilities 100a to 100c (hereinafter, also referred to as "facility 100") are provided in a plant or the like. Such a plant may be, for example, an industrial plant such as a chemical or metal plant; a plant for managing and controlling a well site such as a gas field and an oil field and its surroundings; a plant for managing and controlling electrical power generation such as hydraulic, thermal, and nuclear power generation; a plant for managing and controlling energy harvesting such as solar photovoltaic and wind power generation; a plant for managing and controlling water supply and sewerage, a dam, or the like, etc. Moreover, the facility 100 may be provided in a building, various industrial plants, means of transportation, or the like. Such a facility 100 may have one or more process apparatuses, one or more electrical power generation apparatuses, and one or more other apparatuses.

Each facility 100 may have one or more field equipments. The field equipments may be, for example, sensor equipment such as a pressure meter, a flowmeter, and a temperature sensor; valve equipment such as a flow control valve and an on-off valve; actuator equipment such as a fan and a motor; imaging equipment such as a camera or a video for photographing a situation of a plant or the like and an object such as a facility; acoustic equipment such as a microphone or a speaker for collecting an abnormal noise from a plant, a facility, or the like, etc. or emitting a warning sound or the like; position detection equipment for outputting positional information of an apparatus provided in the facility 100; or another equipment.

The one or more facilities 100 are provided with a plurality of sensors 110a to 110i (hereinafter, also referred to as "sensor 110") that function as sensor equipment, imaging equipment, acoustic equipment, or the like for monitoring these states. Each sensor 110 may be sensor equipment incorporated in the facility 100, and may be retrofitted to the facility 100 or installed near the facility 100. Each sensor 110 may measure a measurement value (such as acceleration, velocity, temperature, pressure, flow rate, or vibration) regarding the facility 100. Two or more sensors 110 may be incorporated in a sensor apparatus for measuring two or more types of measurement values regarding the facility 100. In the example of this figure, the sensors 110a to 110c are provided to monitor a state of the facility 100a, the sensors 110d to 110f are provided to monitor a state of the facility 100b, and the sensors 110g to 110i are provided to monitor a state of the facility 100c.

The monitoring system 10 is provided with one or more gateway apparatuses 120a and 120b, a monitoring apparatus 140, and a terminal 150. The one or more gateway apparatuses 120a and 120b (hereinafter, also referred to as "gateway apparatus 120") are communicably connected to the plurality of sensors 110, and receive a measurement value from each sensor 110. In this embodiment, each gateway apparatus 120 wirelessly communicates with at least one sensor 110 by using Low Power Wide Area (LPWA) such as LoRa as an example. Instead, each gateway apparatus 120 may communicate with the at least one sensor 110 by wire, and may communicate with the at least one sensor 110 by using a communication protocol defined by HART (registered trademark), BRAIN, FOUNDATION Fieldbus (registered trademark), ISA100.11a, or the like. Each gateway apparatus 120 may be connected to two or more sensors 110, and collect measurement values from these two or more sensors 110. In the example of this figure, the gateway apparatus 120a is connected to the sensors 110a to 110f, and the gateway apparatus 120b is connected to the sensors 110g to 110i.

Each gateway apparatus 120 is connected to the network 130, and transmits measurement values from the sensors 110 assigned to each gateway apparatus 120 among the plurality of sensors 110, to the monitoring apparatus 140 via the network 130, which is a wide area network such as the Internet or WAN. In the example of this figure, each gateway apparatus 120 is connected to the network 130 via a wireless network such as a mobile phone line. Instead, each gateway apparatus 120 may be connected to the network 130 via a wired network such as Ethernet (registered trademark).

The monitoring apparatus 140 is connected to the one or more gateway apparatuses 120 via the network 130, and monitors the one or more facilities 100 by using the measurement values from the plurality of sensors 110. The monitoring apparatus 140 may be realized by a computer such as a PC (personal computer), a tablet computer, a smartphone, a workstation, a server computer, or a general-purpose computer, or may be realized by a computer system with a plurality of computers connected thereto. Such a computer system is also a computer in a broad sense. The monitoring apparatus 140 may be a dedicated computer designed for monitoring a facility, or may be a dedicated hardware realized by a dedicated circuit.

In the example of this figure, the monitoring apparatus 140 is a cloud computing system, and provides a facility monitoring environment through a service on a cloud computer to each of one or more customers who monitor a facility such as a plant. Instead, the monitoring apparatus 140 may be provided on the premises of a facility such as a specific plant, and be connected to each sensor 110 or each gateway apparatus 120 via a local area network to provide an on-premises facility monitoring environment. Moreover, the gateway apparatus 120 connected to the at least one sensor 110 may also function as the monitoring apparatus 140.

The terminal 150 is connected to the monitoring apparatus 140 via the network 130, and displays a screen for facility monitoring outputted by the monitoring apparatus 140. Moreover, the terminal 150 inputs an instruction from a monitoring person of a plant or the like provided with the one or more facilities 100, to transmit it to the monitoring apparatus 140. The terminal 150 may be arranged on the premises of a facility such as a plant, or may be arranged at a place away from a facility such as a plant. Note that the screen for facility monitoring may be displayed on an indicator or the like provided in the monitoring apparatus 140, and the instruction from the monitoring person may be inputted by using this indicator or the like.

Figure 2:
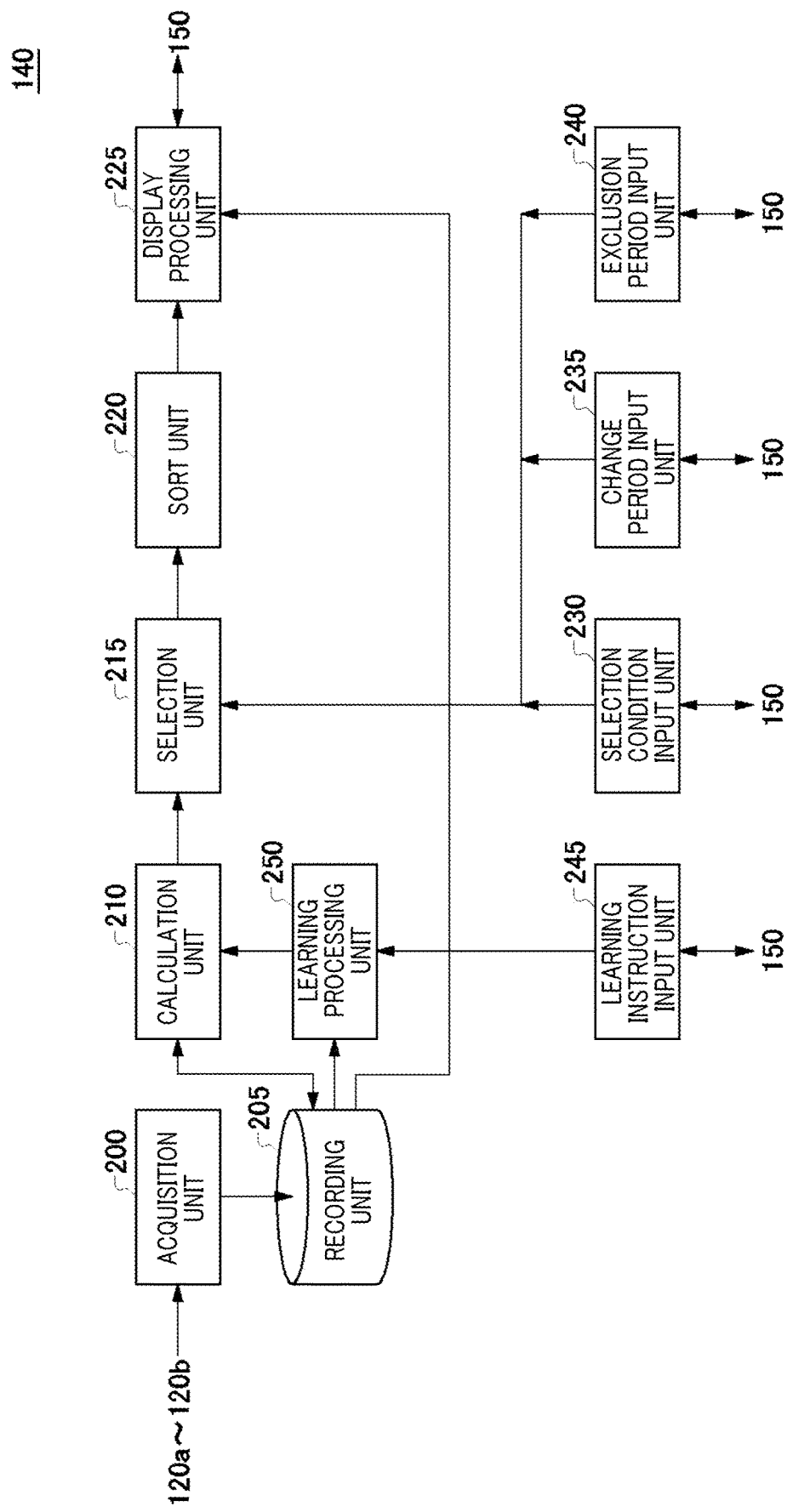
FIG. 2 shows a configuration of a monitoring apparatus 140 according to an embodiment of the present invention.

FIG. 2 shows a configuration of the monitoring apparatus 140 according to this embodiment. The monitoring apparatus 140 is provided with an acquisition unit 200, a recording unit 205, a calculation unit 210, a selection unit 215, a sort unit 220, and a display processing unit 225. The acquisition unit 200 is connected to the one or more gateway apparatuses 120 via the network 130, and acquires the measurement values from the plurality of sensors 110. The acquisition unit 200 continuously acquires a latest measurement value from each sensor 110 at, for example, a predetermined cycle (every second, every minute, every hour, or the like). The recording unit 205 is connected to the acquisition unit 200. The recording unit 205 is, as an example, an external storage such as a hard disk apparatus, and sequentially stores the measurement values acquired by the acquisition unit 200, in association with timing information such as a time or a date and time related to the measurement values, such as a measurement time of each measurement value, an acquisition time at the gateway apparatus 120, an acquisition time at the monitoring apparatus 140, or the like. As such, the recording unit 205 stores historical data of the measurement values from the plurality of sensors 110.

The calculation unit 210 is connected to the recording unit 205. The calculation unit 210 calculates, based on at least one measurement value from the at least one sensor 110 for monitoring a state of each facility 100, the state value of each facility 100. In this embodiment, the calculation unit 210 has, for each of a plurality of facilities 100, a model that calculates a state value from a measurement value from at least one sensor 110 associated with each facility 100, and calculates, for each facility 100, a state value from at least one measurement value by using the model. This model may calculate, based on measurement values from one or more sensors 110 for each facility 100, a diagnostic value indicating a result of diagnosing the facility 100 such as soundness or normality degree, or abnormality degree of said facility 100, as a state value of said facility 100. The calculation unit 210 may store a state value calculated based on a measurement value collected at a certain time in the recording unit 205 in association with the measurement value collected at that time. Note that, in case where a time when the measurement value is acquired is associated with the measurement value, the calculation unit 210 may store the state value calculated based on the measurement value in the recording unit 205 in association with the time when the measurement value is acquired. Moreover, the calculation unit 210 may output at least one measurement value for the facility 100 as a state value of said facility 100, as it is. In this way, the monitoring system 10 may use the above-described diagnostic value, or may use the measurement value, as each "state value".

The selection unit 215 is connected to the calculation unit 210. The selection unit 215 selects, among a plurality of state values corresponding to measurement values from a plurality of sensors 110 that are outputted from the calculation unit 210, a state value that has changed by an amount equal to or greater than a predetermined change width or change rate during a predetermined time length period. This time length is a judgement period length for judging a change in the state value, and this change width or change rate is a judgement threshold for judging whether to select the state value. For example, the selection unit 215 may be set to select a state value that has dropped by 0.3 or more in 5 days. The selection unit 215 judges, for each of the plurality of state values, whether there is a change by an amount equal to or greater than the predetermined change width or change rate between a latest state value and a past state value for a predetermined time length (for example, a state value for 5 days ago), and selects a state value judged to have exhibited such a change as a report target. In this embodiment, the selection unit 215 makes a selection based on whether the state value has changed by the amount equal to or greater than the predetermined change width. Instead, the selection unit 215 may make a selection based on whether the state value has changed by the amount equal to or greater than the predetermined change rate. Note that the selection unit 215 may judge whether there is a change by the amount equal to or greater than the predetermined change width or change rate between the maximum value and the minimum value of the state value within the judgement period.

The sort unit 220 is connected to the selection unit 215. The sort unit 220 receives at least one state value selected by the selection unit 215, and sorts it according to the change width or the change rate. For example, the sort unit 220 rearranges the at least one state value selected, in descending order of the drop width. When the state value for the facility 100 indicates the soundness of the facility 100, it indicates that the larger the drop width of the state value is, the more rapidly the soundness of the facility 100 is deteriorated. Therefore, the sort unit 220 allows, by rearranging the drop width of the state value in descending order, the state value for the facility 100 whose soundness is rapidly deteriorated to be more preferentially presented. Note that, according to a nature of the state value, the instruction of the monitoring person, or the like, the selection unit 215 may sort the state value according to a rise width or a rise rate, or may sort it according to a width or a rate of magnitude of the change (an absolute value of a difference between the latest state value and the past state value).

The sort unit 220 may use, as a sort target, at least one state value that has been selected by the selection unit 215 and is associated with a certain time, or may use it, as the sort target, together with the past state value whose drop width, rise width, or the like is larger than the judgement threshold but that remains because no action has been taken in response to such state value or the like, the past state value within a certain amount of time of a latest time, or the like. Moreover, the sort unit 220 may rearrange the at least one state value selected by the selection unit 215 by using a time associated with the state value. For example, the sort unit 220 may rearrange the at least one state value in chronological order or reverse chronological order.

The display processing unit 225 is connected to the sort unit 220 and the recording unit 205. The display processing unit 225 performs processing to display an information screen corresponding to the at least one state value sorted by the sort unit 220. To perform processing to display a screen includes not only to actually display the screen on a display apparatus but also to generate display data for displaying the screen on a remote display apparatus such as the terminal 150 or the like. In this embodiment, the display processing unit 225 generates display data (for example, a screen layout or the like that configures an information screen) for displaying the sorted state value on the display apparatus of the terminal 150 arranged outside the monitoring apparatus 140, for transmission to the terminal 150. When the monitoring apparatus 140 is provided with a display apparatus, the display processing unit 225 may cause said display apparatus to display an information screen such as a list corresponding to the sorted state value. Moreover, in response to an instruction being inputted from the terminal 150 that a trend graph should be displayed, the display processing unit 225 reads, from the recording unit 205, a state value designated by this instruction and historical data of a measurement value related to this state value, to perform processing to graph and display them.

According to the monitoring apparatus 140 shown above, the plurality of state values corresponding to the measurement values from the plurality of sensors 110 can be selected according to the change width or the change rate, and the selected state value can be sorted according to the change width or the change rate for display. This allows the monitoring apparatus 140 to more preferentially present a change in the state value having a higher level of importance. As a result, compared to when a graph of many measurement values is displayed, the monitoring apparatus 140 can more promptly cope with abnormality or the like of the facility 100 to increase an operation rate of a plant or the like, and reduce generation of the abnormality.

Moreover, when being provided with the calculation unit 210, the monitoring apparatus 140 can calculate, based on the measurement values from the one or more sensors 110, a state value indicating a state of each facility. Therefore, the monitoring apparatus 140 can allow, by preferentially presenting the change in the state value having a higher level of importance, the facility 100 in which the abnormality is possibly generated to be more easily specified. Note that, when the gateway apparatus 120 or the sensor apparatus incorporating the at least one sensor 110 has a function of the calculation unit 210, the monitoring apparatus 140 does not have to be provided with the calculation unit 210.

The monitoring apparatus 140 may be provided with a selection condition input unit 230. The selection condition input unit 230 inputs from the terminal 150, for at least one of the plurality of state values, designation of the judgement period length (the predetermined time length) and of the judgement threshold (at least one of the predetermined change width or change rate). The selection condition input unit 230 sets the designated time length, the change width, or the like in the selection unit 215 as the time length, the change width, or the like used by the selection unit 215 to select the state value.

Moreover, the monitoring apparatus 140 may be provided with a change period input unit 235. The change period input unit 235 inputs from the terminal 150, for the at least one of the plurality of state values, designation of a change period during which a selection condition (for example, at least one of the predetermined time length and the predetermined change width or change rate) by the selection unit 215 is changed and designation of a change value of the selection condition. When an instruction to change the selection condition by the monitoring person or the like is inputted via the terminal 150, the selection unit 215 selects, for a state value for which the change period is designated, a state value by changing the at least one of the predetermined time length and the predetermined change width or change rate to the change value designated, during the change period.

Moreover, the monitoring apparatus 140 may be provided with an exclusion period input unit 240. The exclusion period input unit 240 inputs from the terminal 150, for the at least one of the plurality of state values, designation of an exclusion period during which the at least one of the plurality of state values is excluded from the selection by the selection unit 215. When the designation of the exclusion period by the monitoring person or the like is inputted via the terminal 150, the selection unit 215 avoids selecting, during the exclusion period, a state value for which the exclusion period is designated.

Moreover, the monitoring apparatus 140 may be provided with a learning instruction input unit 245 and a learning processing unit 250. The learning instruction input unit 245 inputs, for the at least one of the plurality of state values, an instruction to learn the model used by the calculation unit 210 to calculate the state value. The learning processing unit 250 is connected to the recording unit 205 and the learning instruction input unit 245. The learning processing unit 250 performs, in response to the instruction being inputted from the terminal 150 that the model should be learned, processing to generate, by learning, the model based on historical data of a plurality of measurement values stored in the recording unit 205. Then, the learning processing unit 250 provides the learned model to the calculation unit 210.

Note that, when an external apparatus such as the gateway apparatus 120 or the sensor apparatus incorporating the at least one sensor 110 has the function of the calculation unit 210, the learning processing unit 250 may supply the learned model to the external apparatus of the monitoring apparatus 140. Moreover, the learning processing unit 250 itself may be provided in the external apparatus.

Figure 3:
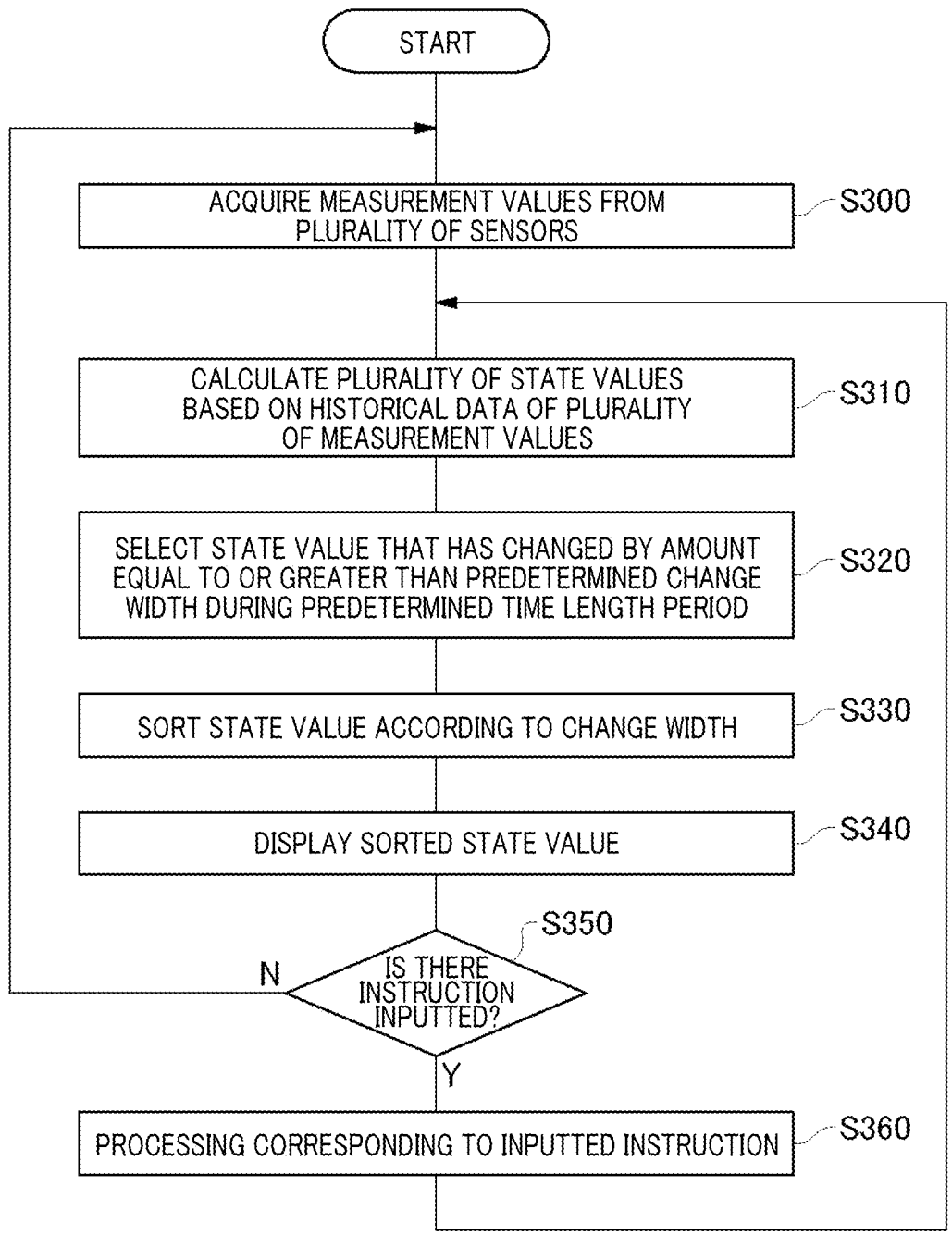
FIG. 3 shows an operational flow of the monitoring apparatus 140 according to an embodiment of the present invention.

FIG. 3 shows an operational flow of the monitoring apparatus 140 according to this embodiment. At S300 (step 300), the acquisition unit 200 acquires latest measurement values from the plurality of sensors 110, to store them in the recording unit 205.

At S310, the calculation unit 210 calculates, for each of the plurality of facilities 100, a state value of said facility 100 by using a model associated with said facility 100. In this embodiment, as an example, the model associated with the facility 100 uses, as an input, one or more measurement values at a certain time point (for example, a current time point or a latest time point) from each sensor 110 assigned to the facility 100, and defines a calculation method for calculating a diagnostic value at a certain time point (for example, the current time point or the latest time point) of the facility 100 from these measurement values. Note that, when being designated to output a certain measurement value as a state value, the calculation unit 210 may output the measurement value as the state value, as it is.

At S320, the selection unit 215 selects, among the plurality of state values outputted from the calculation unit 210, the state value that has changed by the amount equal to or greater than the predetermined change width or change rate during the predetermined time length period. This allows the selection unit 215 to narrow down all measurement values from many sensors 110 provided in a facility such as a plant, to the state values associated with some of the facilities 100 that satisfy the selection condition, instead of setting the measurement values to be displayed in an enumerated state.

At S330, the sort unit 220 receives at least one state value selected by the selection unit 215, and sorts it according to the change width or the change rate. In another embodiment, the monitoring apparatus 140 has no sort unit 220, and may perform processing to display the at least one state value selected by the selection unit 215 without sorting it.

At S340, the display processing unit 225 performs processing to display an information screen corresponding to the at least one state value sorted by the sort unit 220. The display processing unit 225 generates display data for displaying the information screen corresponding to the sorted state value, and transmits them to the terminal 150.

At S350, the display processing unit 225, the selection condition input unit 230, the change period input unit 235, the exclusion period input unit 240, and the learning instruction input unit 245 check whether there is an instruction inputted from the terminal 150. If there is no instruction inputted to any of the display processing unit 225, the selection condition input unit 230, the change period input unit 235, the exclusion period input unit 240, and the learning instruction input unit 245, the monitoring apparatus 140 advances processing to S300, to repeat the processing from S300 for measurement values at a next time point from the plurality of sensors 110.

If there is an instruction inputted to any of the display processing unit 225, the selection condition input unit 230, the change period input unit 235, the exclusion period input unit 240, and the learning instruction input unit 245, the input unit or the like to which the instruction has been inputted performs processing corresponding to the inputted instruction at S360. If there is an instruction inputted for the selection condition, the change period, or the exclusion period, the monitoring apparatus 140 may perform the processing S310 to S350 by using the selection condition or the like updated by the inputted instruction. A specific processing corresponding to the inputted instruction will be described later in correlation with FIGS. 7 to 11.

FIG. 4 shows an example of historical data recorded in the recording unit 205 according to this embodiment. The recording unit 205 stores historical data including: a plurality of measurement values acquired from the plurality of sensors 110 at a plurality of times such as for each predetermined cycle; and a plurality of state values calculated for the plurality of facilities 100.

The historical data shown in this figure has: a time field for recording a time; and a plurality of facility fields for recording a measurement value and a state value for each of the plurality of facilities 100. Each facility field includes: at least one measurement value field for recording a measurement value from at least one sensor 110 assigned to a corresponding facility 100; and a state value field for recording a state value of the corresponding facility 100. The time recorded in the time field may be a time correlated with the measurement value or the state value.

In this figure, the historical data records: measurement values 10.1, 5.3, and 28.1 from a sensor 1 (for example, sensor 110a), a sensor 2 (for example, sensor 110b), and a sensor 3 (for example, sensor 110c) that were acquired at 1:00 on Jun. 1, 2020 for a facility 1 (for example, facility 100a); and a state value 0.95 at 1:00 on Jun. 1, 2020 that was calculated by using these measurement values.

Figure 5:
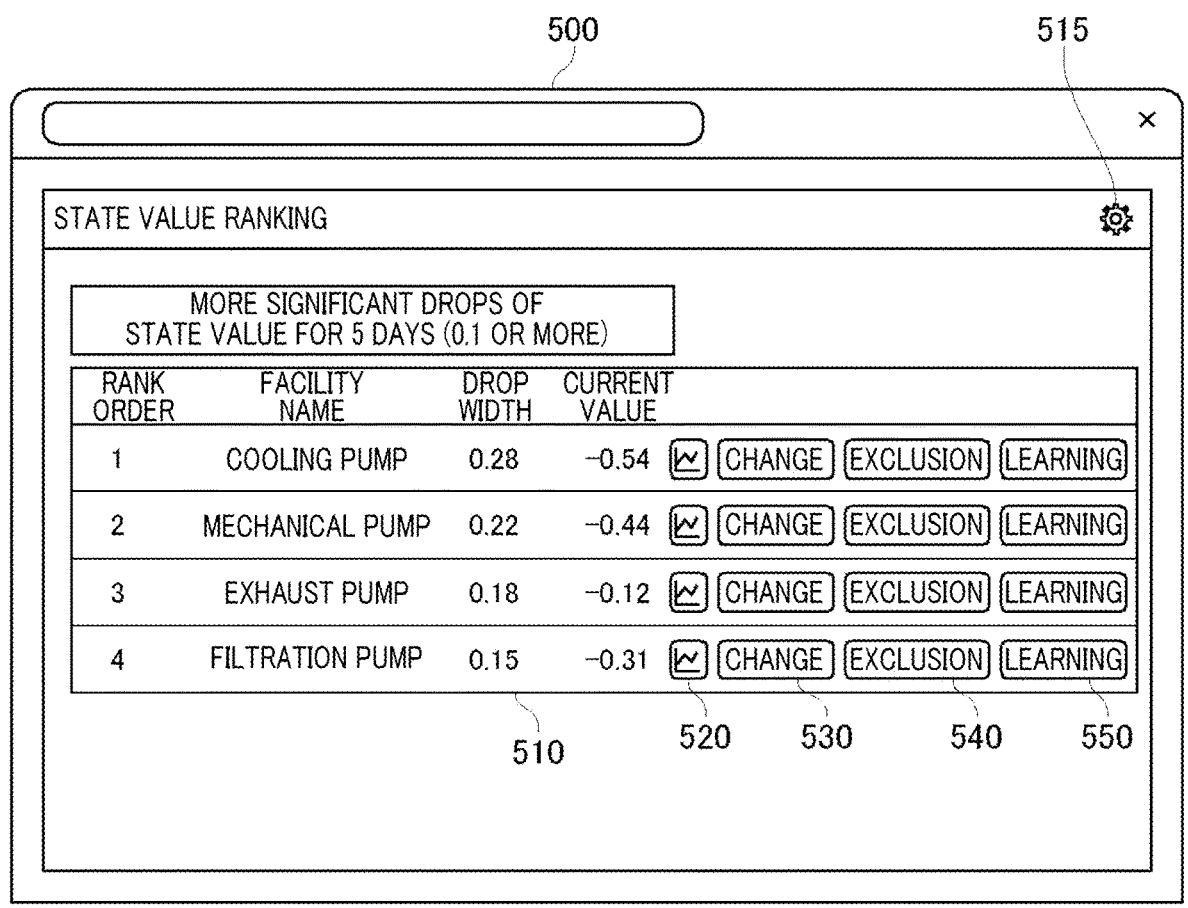
FIG. 5 shows a first example of a ranking screen 500 outputted by the monitoring apparatus 140 according to an embodiment of the present invention.

FIG. 5 shows a first example of a ranking screen 500 outputted by the monitoring apparatus 140 according to this embodiment. The display processing unit 225 performs display processing to display a ranking screen 500 which is an example of the information screen corresponding to the state value sorted by the sort unit 220.

The ranking screen 500 is provided with a list 510 and a setup button 515. The list 510 displays each entry corresponding to each of the at least one state value in sorted order. The list 510 displays, for each entry, a sort rank order, a facility name, a drop width of a state value, and a current state value.

In this embodiment, the state value is an indicator of a soundness of the corresponding facility 100, and the list 510 displays each entry in descending order of the drop width of the state value. In the example of this figure, a state value of "Cooling Pump" is −0.54, and a drop width for 5 days is 0.28, which is the largest. A state value of "Mechanical Pump" is −0.44, and a drop width for 5 days is 0.22, which is the second largest. As a result, the monitoring apparatus 140 can cause the terminal 150 to more preferentially display the facility 100 having a large drop in the soundness, and can more promptly take action, for example, conduct inspection for the facility 100 having a larger drop in the soundness.

Note that the display processing unit 225 may change, according to magnitude of a change width or a change rate of each state value, a display format of said state value. For example, when the change width or the change rate is larger than a threshold different from the judgement threshold for the predetermined change width or change rate, the display processing unit 225 may make emphasis by changing a letter color or background color to a prominent color such as a red color, enlarging a letter, boldfacing a letter, inserting an auxiliary line such as a underline, or changing another display format.

The setup button 515 is a button for instructing to display a selection condition designation screen for designating at least one of the judgement period length and the judgement threshold used by the selection unit 215 to select the state value. The selection condition designation screen will be described later by using FIG. 7.

Moreover, the display processing unit 225 may perform, in association with each of the at least one state value sorted that is in the ranking screen 500, processing to display a graph display button 520. The graph display button 520 is a button for instructing to display a trend graph related to each state value. The display of the trend graph will be described later by using FIG. 8.

The display processing unit 225 may perform, in association with each of the at least one state value sorted that is in the ranking screen 500, processing to display a change button 530. The change button 530 is a button for instructing, for a corresponding state value, to display a selection condition change designation screen for changing the selection condition of the selection unit 215, during the designated change period. The selection condition change designation screen will be described later by using FIG. 9.

The display processing unit 225 may perform, in association with each of the at least one state value sorted that is in the ranking screen 500, processing to display an exclusion button 540. The exclusion button 540 is a button for instructing, for the corresponding state value, to display a screen for excluding the state value from the selection by the selection unit 215, during the designated exclusion period. This screen will be described later in relation to FIG. 9.

The display processing unit 225 may perform, in association with each of sorted state values, processing to display a learning button 550. The learning button 550 is a button for instructing to learn a model that calculates each state value. In this embodiment, the learning button 550 is for instructing to display a learning designation screen for making designation regarding the learning of the model that calculates each state value. The learning designation screen will be described later in relation to FIG. 10.

Note that the display processing unit 225 may display the ranking screen 500 as one of display components such as a dashboard, a window, or a sub-window included in a monitoring screen. As a result, the display processing unit 225 can, as an example, cause the monitoring screen to display a plurality of ranking screens 500 having different parameters such as the time length or the change width used to select the state value.

Figure 6:
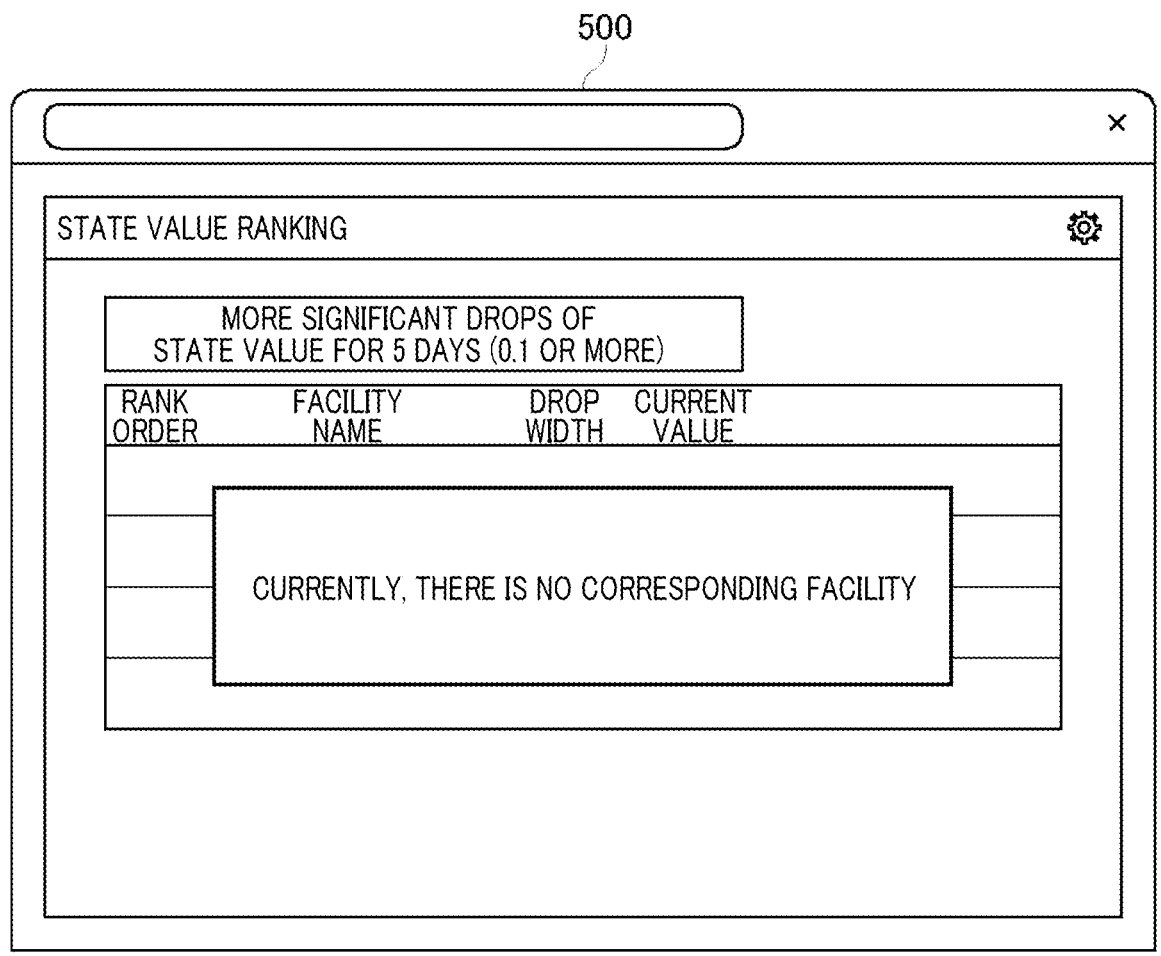
FIG. 6 shows a second example of the ranking screen 500 outputted by the monitoring apparatus 140 according to an embodiment of the present invention.

FIG. 6 shows a second example of the ranking screen 500 outputted by the monitoring apparatus 140 according to this embodiment. As shown in this figure, the display processing unit 225 performs, in response to none of the plurality of state values being selected by the selection unit 215, processing to display that there is no selected state value. In the example of this figure, the display processing unit 225 causes, in response to no state value of any of the facilities 100 being selected, the terminal 150 to display that none of the facilities 100 corresponds to the selection condition. This allows the display processing unit 225 to clearly specify that there is no facility 100 to be noted, and to reduce a management load of a plant or the like in normal operation. Note that, as a display indicating that there is no selected state value, for example, the display processing unit 225 may clearly specify information indicating that there is no selected state value such as by displaying like "0 hits" or the like, that the number of hits of a selected state value is 0, may implicitly display that there is no selected state value such as by displaying a list including no entries but title lines only, or may indicate otherwise that there is no selected state value.

Figure 7:
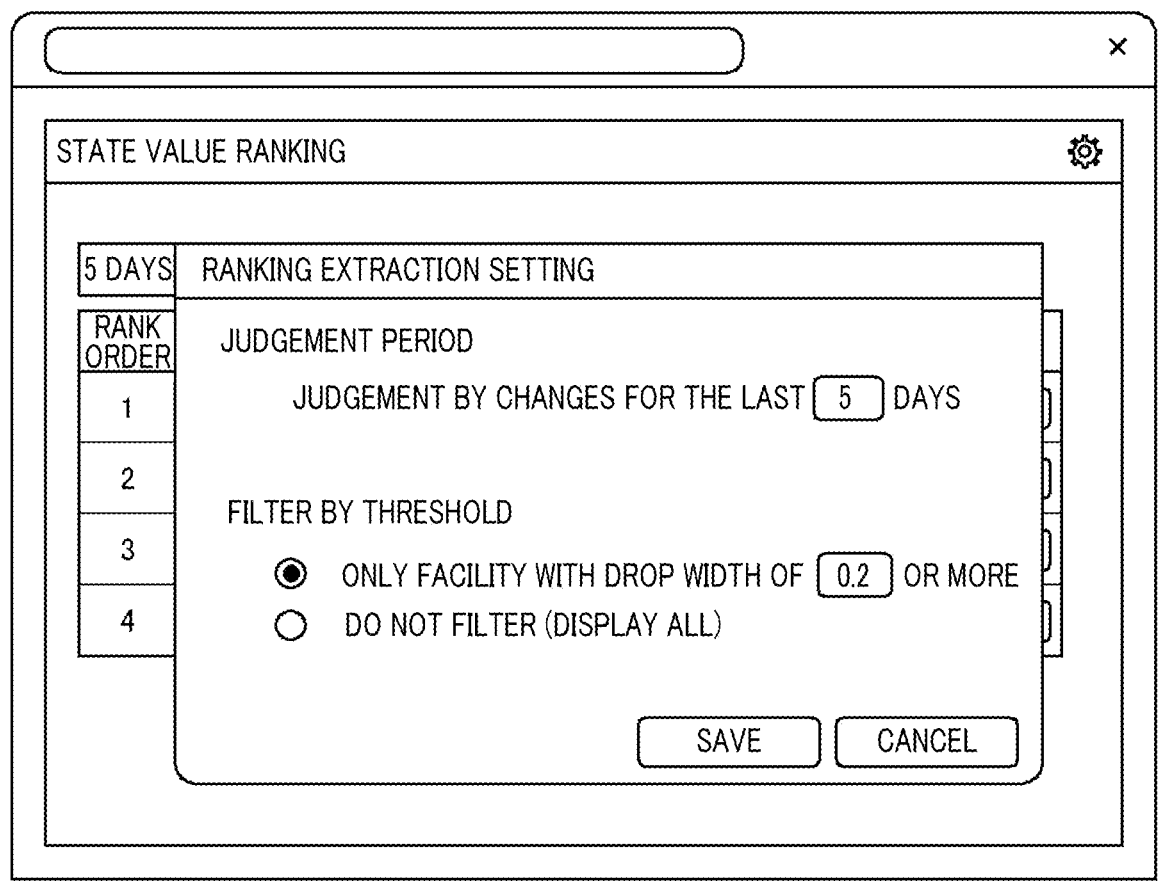
FIG. 7 shows an example of a selection condition designation screen outputted by the monitoring apparatus 140 according to an embodiment of the present invention.

FIG. 7 shows an example of the selection condition designation screen outputted by the monitoring apparatus 140 according to this embodiment. The display processing unit 225 performs, in response to the setup button 515 in the ranking screen 500 being pressed, processing to display the selection condition designation screen of this figure. This selection condition designation screen is a screen for inputting the designation of the judgement period length (the predetermined time length) and of the judgement threshold (the predetermined change width or change rate) used by the selection unit 215 to select the state value.

In the selection condition designation screen, "Judgement period" field is used to accept the judgement period length, as an example, on a daily basis. Instead, in the the selection condition designation screen, another unit such as seconds, minutes, or hours may be used to accept the judgement period length.

Moreover, in the selection condition designation screen, "Filter by threshold" field is used to accept the judgement threshold used during the judgement period. The blank of "Only facility with drop width of (blank) or more" in "Filter by threshold" field accepts an input of a judgement threshold of the drop width of the state value. For example, as in this figure, when "Filter by threshold" field is designated as "Only facility with drop width of 0.2 or more", the selection unit 215 selects a state value that has dropped by 0.2 or more during the judgement period (for example, 5 days) designated in "Judgement period" field. Note that "Do not filter (display all)" in "Filter by threshold" field is for designating that all state values are displayed. When this item is selected, the selection unit 215 selects all state values.

Moreover, the selection condition designation screen may have a save button for saving the above-described designation to set it in the selection unit 215 and a cancel button for canceling the above-described designation. When inputting designation of the selection condition via the selection condition designation screen at S350 of FIG. 3, the selection condition input unit 230 sets the designated selection condition in the selection unit 215 at S360. This allows the selection unit 215 to select, in response to re-execution of S320, the state value by using the selection condition inputted via the selection condition designation screen. Note that the display processing unit 225 may display, as the selection condition designation screen, a screen for only designating either the judgement period length or the judgement threshold, and the selection condition input unit 230 may set the designated judgement period length or judgement threshold in the selection unit 215.

Figure 8:
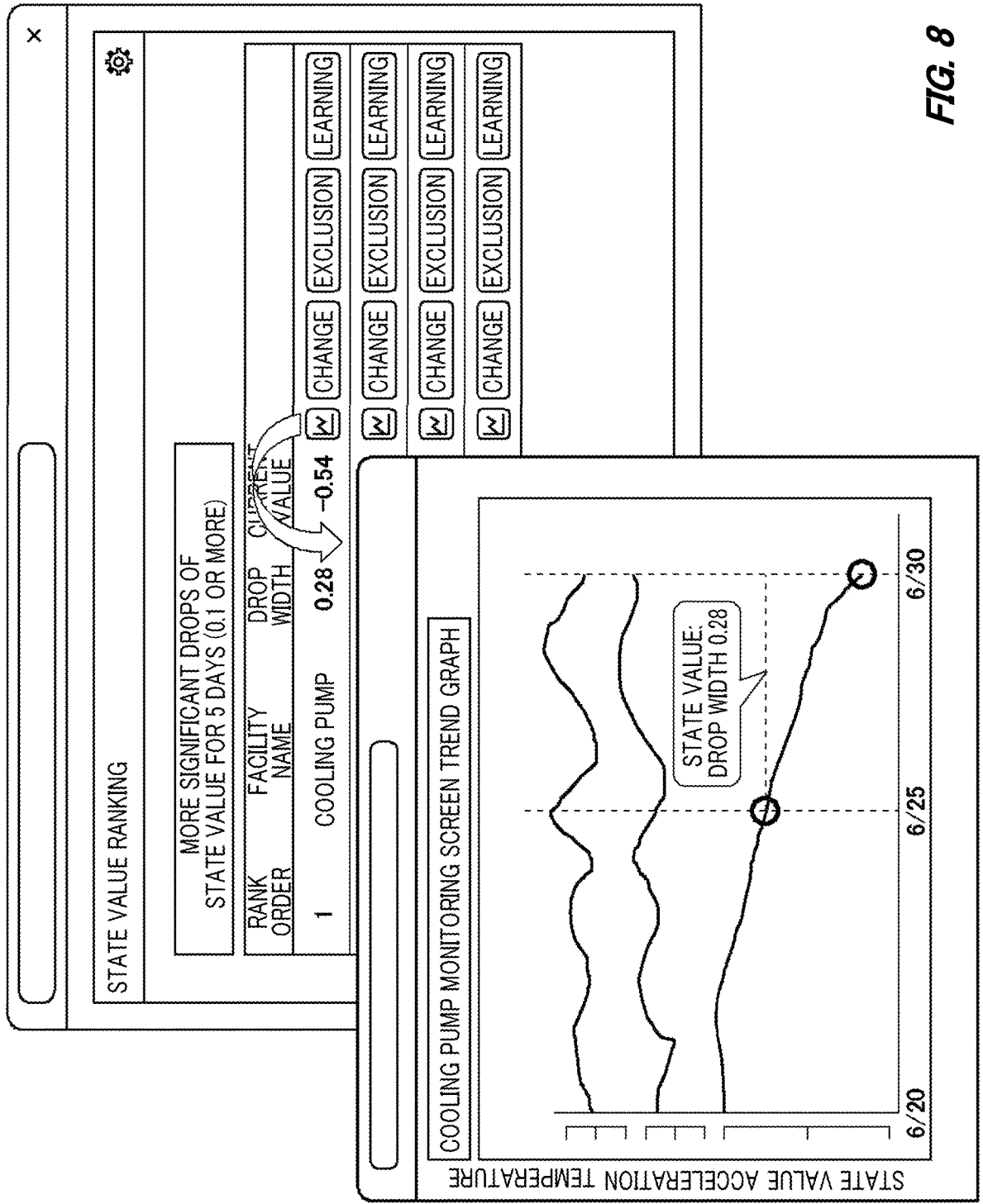
FIG. 8 shows an example of a trend graph outputted by the monitoring apparatus 140 according to an embodiment of the present invention.

FIG. 8 shows an example of a trend graph outputted by the monitoring apparatus 140 according to this embodiment. The display processing unit 225 performs, in response to the graph display button 520 associated with a state value of a certain facility 100 in the ranking screen 500 being pressed, processing to display a trend graph related to a state value of said facility 100. Specifically, the display processing unit 225 outputs, to a display screen, an axis, an axis title, an axis scale, or the like for each of a horizontal axis and a vertical axis of the trend graph. Moreover, the display processing unit 225 reads, from the recording unit 205, a state value of a display target at each time within a display period of the trend graph, to plot it on the trend graph.

The trend graph shows a temporal change of the corresponding state value. In this figure, the horizontal axis shows a time, and the vertical axis shows a state value. The display processing unit 225 may cause the terminal 150 to display additional information such as an auxiliary line or an annotation that allows the change width or the change rate of the state value to be visually confirmed, in addition to the graph itself of the temporal change of the state value. In the trend graph of this example, emphasis is made on points on the graph corresponding to the state values at start and end of the judgement period determined to satisfy the selection condition, by circling them. Moreover, the trend graph of this example includes dashed lines in a vertical axis direction that indicate start and end timings of the judgement period determined to satisfy the selection condition. Moreover, the trend graph of this example includes a dashed line in a horizontal direction that indicates a level of the state value at start of the judgement period determined to satisfy the selection condition. Moreover, the trend graph of this example numerically shows a drop width of the state value by using a balloon or the like.

Moreover, the display processing unit 225 may perform, in addition to a graph of a state value of a target facility 100, processing to display a graph of measurement values from the one or more sensors 110 assigned to said facility 100. Specifically, the display processing unit 225 reads, from the recording unit 205, a measurement value of the display target at each time within the display period of the trend graph, to plot it on the trend graph. The trend graph of this example shows, in addition to a transition of the state value of the facility 100, transitions of measurement values of a temperature and acceleration regarding said facility 100 during the same period.

According to the display processing unit 225 shown above, a trend graph of a state value of the designated facility 100 among the state values of the facility 100 selected by the selection unit 215 can be displayed. As a result, the display processing unit 225 can display more promptly a significant change in a state value selected by the selection unit 215, to allow abnormality of a plant or the like to be eliminated at an early stage.

FIG. 9 shows an example of a selection condition change designation screen outputted by the monitoring apparatus 140 according to this embodiment. The display processing unit 225 performs, in response to the change button 530 associated with a certain state value in the ranking screen 500 being pressed, processing to display the selection condition change designation screen for designating a change to a selection condition of said state value.

The selection condition change designation screen is a screen for inputting, for a target state value, designation of a change period during which the selection condition is changed and designation of a change value of at least one of the judgement period length or the judgement threshold. In the selection condition change designation screen, "Period" field is used to accept the designation of the change period. In the example of this figure, when receiving a selection of "No time limit", the change period input unit 235 inputs designation of an indefinite change period starting from the current time point. Moreover, when receiving a selection of "Until (blank)", the change period input unit 235 inputs designation of a change period from the current time point to a date and time inputted into (blank). Instead, the selection condition change designation screen may allow dates and times when the change period starts and ends to be inputted, or may allow a plurality of change periods to be designated.

Moreover, in the selection condition change designation screen, "Threshold" field is used to accept designation of the judgement threshold. In the example of this figure, when receiving an input into (blank) of "Do not display in ranking when drop width is (blank) or less", the change period input unit 235 inputs a value inputted into (blank) as the judgement threshold of the drop width of the state value. In response to inputs into "Period" field and "Threshold" field, the change period input unit 235 sets, for the corresponding state value, the judgement threshold to a designated value during the designated change period. This judgement threshold is a threshold used by the selection unit 215 to select (or not select) the state value. This allows the selection unit 215 to select, for the state value for which the change period is designated, the state value by changing the judgement threshold to the change value designated, during the change period.

Note that the selection condition change designation screen may accept designation of the change period and designation of the judgement period length during the change period. In this case, the selection unit 215 can select, for the state value for which the change period is designated, the state value by changing the judgement period length to the change value designated, during the change period.

Moreover, the display processing unit 225 performs, in response to the exclusion button 540 associated with a certain state value in the ranking screen 500 being pressed, processing to display an exclusion period designation screen for designating a period during which said state value is excluded from the selection. The exclusion period designation screen may have a screen structure having "Period" field similar to "Period" field of the selection condition change designation screen but having no "Threshold" field. In the exclusion period designation screen, "Period" field is used to accept the designation of the exclusion period. The exclusion period input unit 240 sets, in response to the input into "Period" field, the selection unit 215 to exclude the corresponding state value from the selection, during the designated exclusion period. This can prevent the selection unit 215 from selecting, during the exclusion period, the state value for which the exclusion period is designated.

For the target state value and during the change period, when a cause of a drop or the like of said state value has been already known, the monitoring apparatus 140 can prevent, by allowing at least one of the judgement period length or the judgement threshold to be changed, said state value from being selected even if there is a drop or the like of said state value within a range assumed by that cause. As a result, the monitoring apparatus 140 can cause the terminal 150 to preferentially display another state value selected by the selection unit 215, and can prioritize investigation of a cause of a significant change in the another state value. Moreover, during the exclusion period, the monitoring apparatus 140 can cause, by preventing the target state value from being selected for any change, the terminal 150 to preferentially display the another state value, for example, when abnormality of the facility 100 or the sensor 110 has been already specified.

Figure 10:
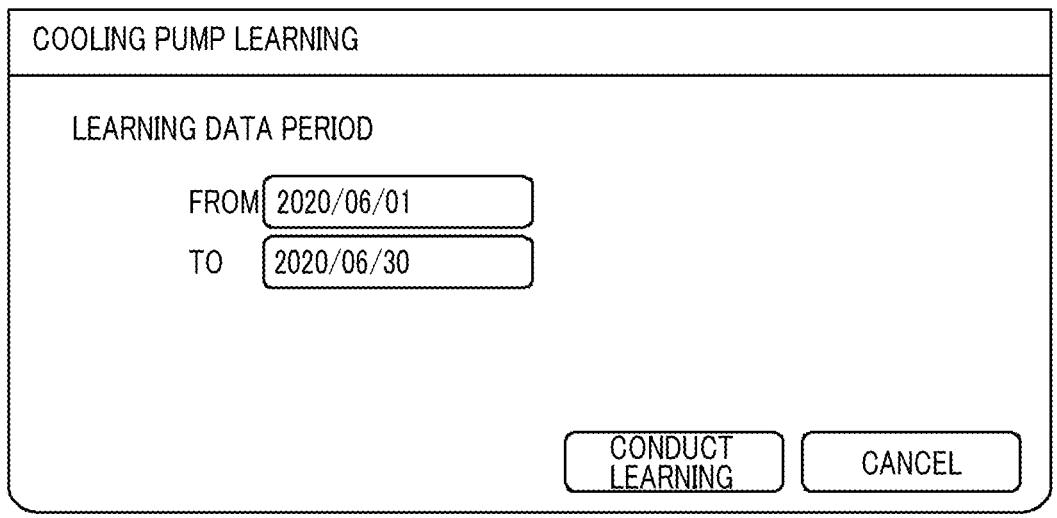
FIG. 10 shows an example of a learning designation screen outputted by the monitoring apparatus 140 according to an embodiment of the present invention.

FIG. 10 shows an example of the learning designation screen outputted by the monitoring apparatus 140 according to this embodiment. The display processing unit 225 performs, in response to the learning button 550 associated with a certain state value in the ranking screen 500 being pressed, processing to display the learning designation screen for making designation regarding learning of a model that calculates said state value. Then, the learning processing unit 250 performs, in response to the learning button 550 being pressed, processing to generate the model by learning after receiving the designation regarding the learning of the model.

The learning designation screen according to this embodiment inputs designation of a period of learning data used to learn the model that calculates the target state value. In the example of this figure, the learning designation screen accepts designation of a start date and an end date of the period of the learning data. Instead, the learning designation screen may allow a plurality of periods of the learning data to be inputted. Moreover, the learning designation screen may allow a hyperparameter (a parameter set prior to learning such as the number of layers in a neural network, the number of neurons in each layer, or the like) such as a set value that does not change due to the learning in the model, to be inputted.

The learning designation screen may have "Conduct learning" button for instructing to start the learning of the model by using the designation regarding the learning. When "Conduct learning" button is pressed, the learning instruction input unit 245 inputs the period of the learning data designated by the learning designation screen to provide it to the learning processing unit 250, and instructs the learning processing unit 250 to start the learning.

When the start of the learning is instructed, the learning processing unit 250 acquires, from the recording unit 205, the measurement value from the at least one sensor 110 used to calculate the target state value at each timing during a period designated by the learning instruction input unit 245, to use it as the learning data. When the target state value is, for example, the state value of the facility 100*a*, the learning processing unit 250 includes, in the learning data, measurement values from the sensors 110*a* to 110*c* for monitoring the state of the target facility 100*a*. In this embodiment, the learning processing unit 250 uses, for each timing during the period of the learning data, a set of measurement values from the sensors 110*a* to 110*c* as one sample of the learning data.

In this embodiment, the learning processing unit 250 generates, by learning, a model by unsupervised learning. As an example, the learning processing unit 250 may perform processing to generate, by learning, the model by statistical learning using at least one measurement value included in the learning data. As an example of the statistical learning, the learning processing unit 250 may use the learning data to calculate probability distribution of a sample in a multi-dimensional space (a space whose dimension is the number of measurement values included in each sample), to give it to the model. Since abnormality is rarely generated in a plant or the like, and it is operating almost properly during the period of the learning data, it can be estimated that the farther a new set of measurement values is deviated from the probability distribution, the more likely it is to be abnormal. Using this probability distribution allows the model to calculate, when a new set of measurement values is inputted, how far the new set of measurement values is deviated from the probability distribution. As an example, such a model outputs, as a state value, a value that drops as it is deviated from the probability distribution.

The above-described model may output a state value obtained by normalizing a degree of deviation from probability distribution by a standard deviation of the probability distribution. As a result, the sort unit 220 can give higher priority to a state value presumed to be likely to be abnormal by comparing and rearranging normalized state values.

Instead of the above, the learning processing unit 250 may learn the model by supervised learning. In this case, each sample in the learning data is labeled as normal, abnormal, or the like. For example, the learning instruction input unit 245 may input, by the learning designation screen, designation of a normal period during which the target facility 100 was normal and an abnormal period during which the target facility 100 was abnormal, to add to each sample in the learning data a label corresponding to this designation.

The model may be, as an example, a neural network, SVM, or the like. The learning instruction input unit 245 updates a parameter of the model so as to reduce an error between an output by the model when each sample in the learning data is inputted into the model, and a label. For example, when a neural network is used, the learning instruction input unit 245 adjusts, by a method such as backpropagation, weight between each neuron of the neural network, bias of each neuron, and the like, by using an error between an output value outputted by the neural network in response to each sample being inputted, and a label.

For a certain state value in the ranking screen 500, the monitoring apparatus 140 can use a measurement value of a period suitable for calculating each state value to generate a model with higher accuracy, by inputting designation of a period of learning data to generate a model by learning in response to the learning button 550 being pressed. Moreover, when the state value outputted by the learned model is not appropriate, the monitoring apparatus 140 can change, in response to the learning button 550 being pressed, a range of measurement values used as learning data from among the measurement values stored in the recording unit 205, to update the model by re-learning.

FIG. 11 shows an example of a selection condition designation screen according to a variation of this embodiment. The display processing unit 225 may perform processing to display the selection condition designation screen of this figure instead of the selection condition designation screen of FIG. 7.

In this selection condition designation screen, "Judgement period" field is used to accept the judgement period length as in FIG. 7. Moreover, in the selection condition designation screen, "Target data" field is used to accept designation of whether to select a diagnostic value of each facility 100 as a state value to be displayed or select a measurement value from each sensor 110 as the state value. When it is designated to select the measurement value from each sensor 110 as the state value, the monitoring apparatus 140 performs various types of processing described in relation to FIGS. 1 to 10 by using the measurement value as the state value instead of the diagnostic value.

Moreover, in the selection condition designation screen, "Direction of change" field is used to accept selection of whether to use a state value that has risen by an amount equal to or greater than the judgement threshold as a selection target or use a state value that has dropped by the amount equal to or greater than the judgement threshold as the selection target. When the selection condition input unit 230 inputs an instruction to use the state value that has risen by the amount equal to or greater than the judgement threshold as the selection target, the selection unit 215 selects a state value that has changed by an amount equal to or greater than a rise width or a rise rate that is equal to or greater than the judgement threshold during the judgement period. When the selection condition input unit 230 inputs an instruction to use the state value that has dropped by the amount equal to or greater than the judgement threshold as the selection target, the selection unit 215 selects a state value that has changed by an amount equal to or greater than a drop width or a drop rate that is equal to or greater than the judgement threshold during the judgement period.

Moreover, in the selection condition designation screen, "Filter by threshold" field is used to accept the judgement threshold as in FIG. 7. Moreover, in the selection condition designation screen accepts, "Moving average processing" field is used to accept designation of whether to use a state value (an instantaneous value) of each timing, as it is, as a target of selection by the selection unit 215, sort by the sort unit 220, display by the display processing unit 225, and the like or use a result obtained by calculating a moving average of the state value (the instantaneous value) of each timing, which is considered as a state value to be processed, as the target of these processing.

When "Do not use" is selected in "Moving average processing" field, the selection condition input unit 230 instructs the calculation unit 210 to output the instantaneous value of the state value calculated for each timing as a state value. Consequently, the calculation unit 210 outputs the instantaneous value of the state value calculated for each timing as the state value to be processed, as it is. When "Window size: (blank) data" is selected in "Moving average processing" field, and the number of samples of an instantaneous value obtained by taking a moving average is designated in (blank), the selection condition input unit 230 instructs the calculation unit 210 to output, as the state value to be processed, a result obtained by calculating a moving average of the instantaneous value of the state value calculated for each timing for the number of samples designated in (blank). For example, when it is designated in (blank) that the number of samples is 10 as in this figure, the selection condition input unit 230 instructs the calculation unit 210 to output, as a state value to be processed at a time t, an average value of instantaneous values of the last 10 samples at times t, t−1, . . . , t−9. In response to receiving such an instruction, the calculation unit 210 calculates a moving average value of the instantaneous value of the state value at each timing, to output it as the state value to be processed.

This allows the monitoring apparatus 140 to select, sort, and display the state value based on a trend of a change in the state value by performing a moving average processing, even if the measurement value or the diagnostic value used as the state value does not smoothly change.

Various embodiments of the present invention may be described with reference to flowcharts and block diagrams, whose blocks may represent (1) steps of processes in which operations are executed or (2) units of apparatuses responsible for executing operations. Specific steps and units may be implemented by a dedicated circuit, a programmable circuit supplied with a computer-readable instruction stored on a computer-readable medium, and/or a processor supplied with a computer-readable instruction stored on a computer-readable medium. The dedicated circuit may include digital and/or analog hardware circuits and may include an integrated circuit (IC) and/or a discrete circuit. The programmable circuit may include a reconfigurable hardware circuit including, for example, a logical AND, a logical OR, a logical XOR, a logical NAND, a logical NOR, and another logical operation, a flip-flop, a register, a memory element such as a field-programmable gate array (FPGA), a programmable logic array (PLA), or the like.

The computer-readable medium may include any tangible device that can store an instruction for execution by a suitable device, so that the computer-readable medium having an instruction stored thereon is provided with an article of manufacture including an instruction which can be executed in order to create a means for executing an operation designated in the flowcharts or the block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a BLU-RAY (registered trademark) disk, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

The computer-readable instruction may be provided to a programmable circuit or a processor of a programmable data processing apparatus such as a general-purpose computer, a special-purpose computer, or another computer, locally or via a local area network (LAN), a wide area network (WAN) such as the Internet or the like, and the computer-readable instruction may be executed in order to create the means for executing the operation designated in the flowcharts or the block diagrams. Examples of the processor include a computer processor, a processing unit, a microprocessor, a digital signal processor, a controller, a microcontroller, and the like.

Figure 12:
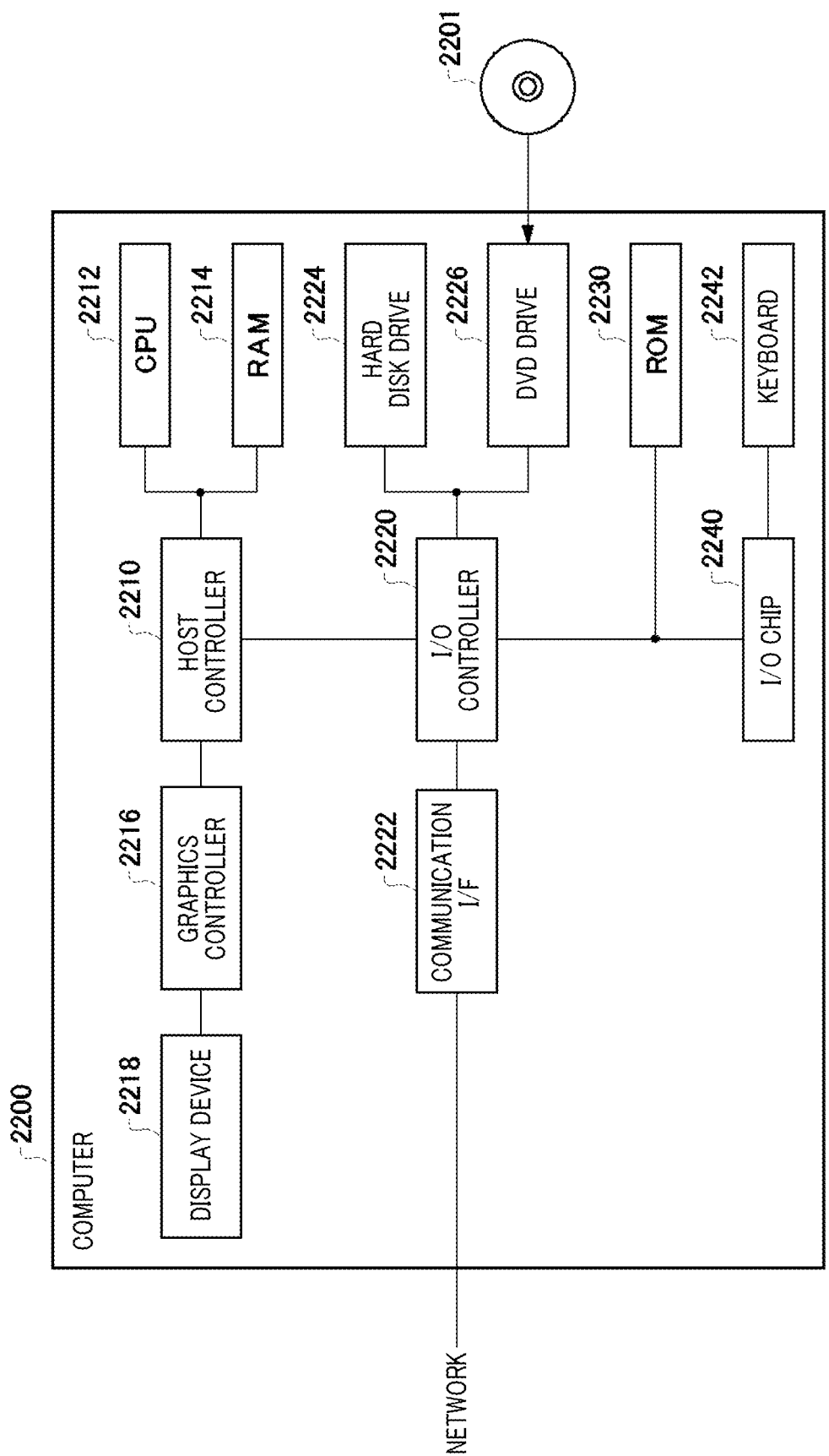
FIG. 12 shows an example of a computer 2200 in which a plurality of aspects of the present invention may be entirely or partially embodied.

FIG. 12 shows an example of a computer 2200 in which a plurality of aspects of the present invention may be entirely or partially embodied. A program that is installed in the computer 2200 can cause the computer 2200 to function as or execute an operation correlated with an apparatus according to an embodiment of the present invention or one or more units of the apparatus, and/or can cause the computer 2200 to execute a process according to an embodiment of the present invention or steps of the process. Such a program may be executed by a CPU 2212 in order to cause the computer 2200 to execute a specific operation correlated with some or all of the blocks of the flowcharts and the block diagrams described herein.

The computer 2200 according to this embodiment includes the CPU 2212, a RAM 2214, a graphics controller 2216, and a display device 2218, which are interconnected by a host controller 2210. The computer 2200 also includes an input/output unit such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 acquires image data generated by the CPU 2212 on a frame buffer or the like provided in the RAM 2214 or in itself, such that the image data is displayed on the display device 2218.

The communication interface 2222 communicates with another electronic device via a network. The hard disk drive 2224 stores a program and data used by the CPU 2212 in the computer 2200. The DVD-ROM drive 2226 reads the program or the data from a DVD-ROM 2201, and provides the program or the data to the hard disk drive 2224 via the RAM 2214. The IC card drive reads the program and the data from an IC card, and/or writes the program and the data into the IC card.

The ROM 2230 stores therein a boot program or the like executed by the computer 2200 at the time of activation, and/or a program depending on a hardware of the computer 2200. The input/output chip 2240 may also connect various input/output units to the input/output controller 2220 via a parallel port, a serial port, a keyboard port, a mouse port, or the like.

A program is provided by a computer-readable medium such as the DVD-ROM 2201 or the IC card. The program is read from the computer-readable medium, is installed in the hard disk drive 2224, the RAM 2214, or the ROM 2230, which is also an example of the computer-readable medium, and is executed by the CPU 2212. Information processing written in these programs is read into the computer 2200, resulting in cooperation between a program and the above-described various types of hardware resources. An apparatus or a method may be constituted by realizing handling or processing of information in accordance with usage of the computer 2200.

For example, when communication is executed between the computer 2200 and an external device, the CPU 2212 may execute a communication program loaded onto the RAM 2214, and instruct the communication interface 2222 to process the communication based on the processing written in the communication program. Under control of the CPU 2212, the communication interface 2222 reads transmission data stored in a transmission buffering region provided in a recording medium such as the RAM 2214, the hard disk drive 2224, the DVD-ROM 2201, or the IC card, and transmits the read transmission data to the network, or writes reception data received from the network to a reception buffering region or the like provided on the recording medium.

Moreover, the CPU 2212 may cause all or a necessary portion of a file or a database to be read into the RAM 2214, the file and the database having been stored in an external recording medium such as the hard disk drive 2224, the DVD-ROM drive 2226 (DVD-ROM 2201), the IC card, or the like, and execute various types of processing on the data on the RAM 2214. The CPU 2212 then writes back the processed data to the external recording medium.

Various types of information such as various types of programs, data, tables, and databases may be stored in the recording medium, and undergo information processing. The CPU 2212 may execute, on the data read from the RAM 2214, various types of processing including various types of operations, information processing, conditional judgement, conditional branch, unconditional branch, information search/replacement, and the like as described throughout the present disclosure and designated by an instruction sequence of programs, and writes back the result to the RAM 2214. Moreover, the CPU 2212 may search for information in the file, the database, or the like in the recording medium. For example, when a plurality of entries each having an attribute value of a first attribute correlated with an attribute value of a second attribute, are stored in the recording medium, the CPU 2212 may search for an entry matching a condition whose attribute value of the first attribute is designated, from among the plurality of entries, and read the attribute value of the second attribute stored in the entry, thereby acquiring the attribute value of the second attribute correlated with the first attribute that satisfies a predetermined condition.

The program or the software module described above may be stored on the computer 2200 or in a computer-readable medium near the computer 2200. Moreover, a recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A monitoring apparatus comprising:
   a selection unit configured to determine, among a plurality of state values corresponding to measurement values from a plurality of sensors for monitoring states of a plurality of facilities, at least two state values that have changed by an amount equal to or greater than a predetermined change amount or change rate during a predetermined time length period;
   a sort unit configured to sort the at least two state values according to a change amount or a change rate thereof; and
   a display processing unit configured to perform processing to display an information screen corresponding to the at least two state values sorted, the information screen including a learning button; and
   a calculation unit configured to, upon activation of the learning button, cause learning a model to calculate each of the plurality of state values.

2. The monitoring apparatus according to claim 1 wherein the calculation unit is further configured to calculate, based on at least one measurement value from at least one sensor of the plurality of sensors for monitoring states of the plurality of facilities, a state value of each of the plurality of facilities.

3. The monitoring apparatus according to claim 2 further comprising
   a learning processing unit configured to perform, for each of the plurality of facilities, processing to generate, by learning, a model that calculates the state value from the at least one measurement value, wherein
   the calculation unit is further configured to calculate, for each of the plurality of facilities, the state value from the at least one measurement value by using the model.

4. The monitoring apparatus according to claim 3, wherein the learning processing unit is further configured to perform, for at least one of the plurality of facilities, processing to generate, by learning, the model by statistical learning using the at least one measurement value.

5. The monitoring apparatus according to claim 3, wherein:
the display processing unit is further configured to perform, in association with each of sorted state values, processing to display a learning button for instructing to generate the model; and
the learning processing unit is further configured to perform, in response to the learning button being pressed, processing to generate the model by learning.

6. The monitoring apparatus according to claim 4, wherein:
the display processing unit is further configured to perform, in association with each of sorted state values, processing to display a learning button for instructing to generate the model; and
the learning processing unit is further configured to perform, in response to the learning button being pressed, processing to generate the model by learning.

7. The monitoring apparatus according to claim 1 further comprising a selection condition input unit configured to input, for at least one of the plurality of state values, designation of at least one of the predetermined time length and the predetermined change amount or change rate.

8. The monitoring apparatus according to claim 2 further comprising a selection condition input unit configured to input, for at least one of the plurality of state values, designation of at least one of the predetermined time length and the predetermined change amount or change rate.

9. The monitoring apparatus according to claim 1 further comprising
an exclusion period input unit configured to input, for the at least one of the plurality of state values, designation of an exclusion period during which the at least one of the plurality of state values is excluded from the selection by the selection unit, wherein
the selection unit is further configured not to select, during the exclusion period, a state value for which the exclusion period is designated.

10. The monitoring apparatus according to claim 2 further comprising
an exclusion period input unit configured to input, for the at least one of the plurality of state values, designation of an exclusion period during which the at least one of the plurality of state values is excluded from the selection by the selection unit, wherein
the selection unit is further configured not to select, during the exclusion period, a state value for which the exclusion period is designated.

11. The monitoring apparatus according to claim 1 further comprising
a change period input unit configured to input, for the at least one of the plurality of state values, designation of a change period during which the at least one of the predetermined time length and the predetermined change amount or change rate is changed, and designation of a change value of the at least one of the predetermined time length and the predetermined change amount or change rate, wherein
the selection unit is further configured to select, for a state value for which the change period is designated, a state value by changing the at least one of the predetermined time length and the predetermined change amount or change rate to the change value designated, during the change period.

12. The monitoring apparatus according to claim 2 further comprising
a change period input unit configured to input, for the at least one of the plurality of state values, designation of a change period during which the at least one of the predetermined time length and the predetermined change amount or change rate is changed, and designation of a change value of the at least one of the predetermined time length and the predetermined change amount or change rate, wherein
the selection unit is further configured to select, for a state value for which the change period is designated, a state value by changing the at least one of the predetermined time length and the predetermined change amount or change rate to the change value designated, during the change period.

13. The monitoring apparatus according to claim 1, wherein the display processing unit is further configured to:
perform, in association with each of the at least one state value sorted, processing to display a graph display button for instructing to display a trend graph related to said state value; and
perform, in response to the graph display button being pressed, processing to display a trend graph related to a corresponding state value.

14. The monitoring apparatus according to claim 2, wherein the display processing unit is further configured to:
perform, in association with each of the at least one state value sorted, processing to display a graph display button for instructing to display a trend graph related to said state value; and
perform, in response to the graph display button being pressed, processing to display a trend graph related to a corresponding state value.

15. The monitoring apparatus according to claim 1, wherein the display processing unit is further configured to perform, in response to none of the plurality of state values being selected by the selection unit, processing to display that there is no selected state value.

16. The monitoring apparatus according to claim 2, wherein the display processing unit is further configured to perform, in response to none of the plurality of state values being selected by the selection unit, processing to display that there is no selected state value.

17. The monitoring apparatus according to claim 1, wherein the display processing unit is further configured to change, according to magnitude of a change amount or a change rate of each state value, a display format of said state value.

18. The monitoring apparatus according to claim 2, wherein the display processing unit is further configured to change, according to magnitude of a change amount or a change rate of each state value, a display format of said state value.

19. A monitoring method comprising:
selecting by a monitoring apparatus, among a plurality of state values corresponding to measurement values from a plurality of sensors for monitoring states of a plurality of facilities, at least two state values that have changed by an amount equal to or greater than a predetermined change amount or change rate during a predetermined time length period;
sorting by the monitoring apparatus, the at least two state values, according to a change amount or a change rate;
performing by the monitoring apparatus, processing to display an information screen corresponding to the at least two state values sorted, the information screen including a learning button; and learning, upon activation of the learning button, a model to calculate each of the plurality of state values.

20. A non-transitory computer-readable medium having recorded thereon a monitoring program that, when executed by a computer, causes the computer to function as a monitoring apparatus comprising:

a selection unit configured to select, among a plurality of state values corresponding to measurement values from a plurality of sensors for monitoring states of a plurality of facilities, at least two state values that have changed by an amount equal to or greater than a predetermined change amount or change rate during a predetermined time length period;

a sort unit configured to sort the at least two state values, according to a change amount or a change rate;

a display processing unit configured to perform processing to display an information screen corresponding to the at least two state values sorted, the information screen including a learning button; and a calculation unit configured to, upon activation of the learning button, cause learning a model to calculate each of the plurality of state values.

* * * * *